United States Patent [19]
Grant

[11] 3,889,534
[45] June 17, 1975

[54] FLOWMETERS

[75] Inventor: John Grant, Warrington, England

[73] Assignee: United Kingdom Atomic Energy Authority, London, England

[22] Filed: Mar. 14, 1973

[21] Appl. No.: 341,080

[30] Foreign Application Priority Data
Mar. 24, 1972 United Kingdom............... 14130/72

[52] U.S. Cl............................. 73/194 B; 73/194 M
[51] Int. Cl. ............................................ G01f 5/00
[58] Field of Search ...... 73/194 M, 194 B; 137/803, 137/826

[56] References Cited
UNITED STATES PATENTS

| | | |
|---|---|---|
| 3,116,639 | 1/1964 | Bird .................................. 73/194 |
| 3,370,463 | 2/1968 | Thanaud ............................. 73/194 |
| 3,452,603 | 7/1969 | Kaiser ................................ 73/466 |
| 3,605,778 | 9/1971 | Metzger ............................. 73/194 |
| 3,690,171 | 9/1972 | Tippetts et al...................... 73/194 |
| 3,719,073 | 3/1973 | Mahon ............................... 73/194 |
| 3,776,033 | 12/1973 | Herzl ................................. 73/194 |

Primary Examiner—Herbert Goldstein
Attorney, Agent, or Firm—Larson, Taylor & Hinds

[57] ABSTRACT

A method of measuring mass fluid flow through a fluidic oscillator designed to oscillate at a frequency which is proportional to the volume rate of flow through the oscillator by sensing pressure changes in the oscillator, converting the pressure changes to electrical signals representative of the amplitude and frequency of the pressure changes and integrating the signals.

4 Claims, 1 Drawing Figure

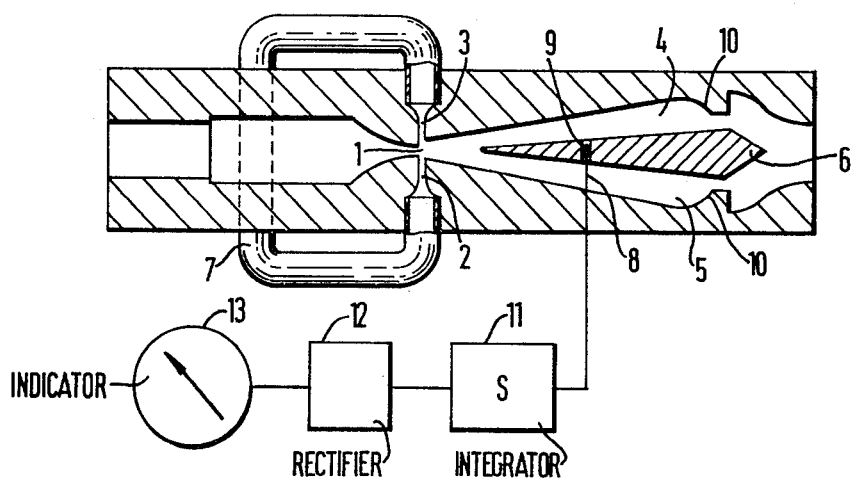

/ # FLOWMETERS

BACKGROUND OF THE INVENTION

This invention relates to flowmeters, and provides in particular means for measuring mass flow by passing the flow through a fluidic oscillator which is a device which produces oscillations when it is energised by a flow of fluid.

With a fluidic oscillator oscillations can be set up in a flowing fluid such that the frequency of oscillation is almost proportional to volume flow and hence to fluid velocity, the frequency being substantially independent of the density and viscosity of the fluid flow.

SUMMARY OF THE INVENTION

According to the invention a method of measuring mass fluid flow comprises the steps of passing the fluid flow through a fluidic oscillator, sensing pressure changes in the fluid flow through the oscillator, converting the sensed pressure changes to signals representative of the amplitude and frequency of the pressure change, integrating the signals and determining the value of the integrated signal.

Also according to the invention a mass flowmeter comprises a fluid oscillator, a transducer for sensing changes in the pressure of fluid flowing through the oscillator and converting the changes to signals representative of the amplitude and frequency of the changes, measn for means the signals, and means for determining the value of the integrated signals.

For well-developed turbulent flow through a fluidic oscillator pressure changes caused by that flow are generally proportional to the density $\rho$ of the flow and the square of the fluid velocity. This can be explained by the fact that the pressures are created by the rate of change of momentum at the measuring point. Since the fluid velocity is proportional to volume flow $V$ any pressure change $P$ due to flow can be expressed as $$P = K\rho V^2$$

where $K$ is a constant which is fixed by the design of the oscillator and the position at which the pressure is measured. Therefore if the oscillation in a fluidic oscillator is measured by a pressure tranducer the amplitude of the oscillation (ie the pressure change) will be $K_1\rho V^2$. This can provide a measure of mass flow (equal to $\rho V$) by dividing the pressure change by the volume flow $V$. In the case where the oscillation is sinusoidal or almost so this division can be accomplished by integration as follows.

Suppose the oscillation as measured by the transducer is a signal representative of a pressure change $X$. Then $$X = K_2 \rho V^2 \cos \omega t$$

where $\omega$ is the frequency of oscillation (proportional to volume flow $V$).

If this equation is integrated and $\rho$ and $V$ are considered as constants relative to $\cos \omega t$ because they change only slowly with time the result is $$X_1 = K_2 \frac{\rho V^2}{\omega} \sin \omega t$$
$$\text{or } K_3 \rho V \sin \omega t$$

since $\omega$ is proportional to $V$.

BRIEF DESCRIPTION OF THE DRAWINGS

The single FIGURE in the drawings is a diagrammatic view in medial section of a fluidic oscillator incorporating the mass flowmeter of the invention.

DESCRIPTION OF THE PREFERRED EMBODIMENTS

The value of $X_1$ can be determined using an instrument such as an alternating current voltmeter for example and can provide a measure of mass flow ($\rho V$) by calibration of the instrument.

Integration may be implemented by a network or an integrating amplifier. Integrating devices, and filters and other devices which perform operations very similar to integrating devices, are well known. The integrating action may also be produced by mechanical analogues of the integrating filter. It is convenient to use a pressure transducer which detects the frequency of oscillation and has as an output an electrical signal $X_3 = K_4 \rho V^2 \cos \omega t$, and an integrating amplifier (or a filter whose action approximates to an integrating amplifier) connected to the electrical output of the pressure transducer to give the required mass flow signal.

The fluidic oscillator may be of the wall attachment type described in U.S. Pat. No. 3,690,171 and British Pat. No. 1,297,154. The invention as incorporated in such a fluidic oscillator is illustrated in the drawings. Thus, referring to the drawings, a fluidic oscillator is shown which includes an entry nozzle 1, control ports 2, 3, outlet channels 4, 5 and a splitter 6. The control ports 2, 3 are connected together by a pipe 7. A channel 8 provides a connection extending between the outlet channels 4, 5. In this channel 8 is housed a microphone 9 providing differential pressure sensing means. Restrictions 10 are provided in the outlet channels 4, 5 downstream of the channel 8. The output of pressure sensing means 9 is connected to an integrator or integrating amplifier 11. A rectifier 12 rectifies the output of integrator 11 and an indicator 13 provides an indication of the output of rectifier 12, or, as noted below, provides both further integration and display of the integrated signal.

It is an advantage of the invention that a fluidic oscillator having no moving parts is used. It is also an advantage of the invention that only a single piece of equipment (a pressure transducer) has to be inserted in the fluid flowpath and that integration of an electrical signal is a relatively simple function compared with previous methods of measuring mass flow by separately measuring volume flow and pressure drop due to an impedance, then performing a division.

In addition to displaying the amplitude of signal $X_3$ as a measure of instantaneous mass flow per unit time the sinusoidal signal may be rectified using rectifier 12, and integrated again to give a measurement of total or time-integrated flow. For example, the rectified signal may be applied to drive an electric motor whose shaft rotation is an integration of the driving signal and the shaft can actuate a mechanical counter, the motor and counter being represented by indicator 13 in the drawings. Alternatively the rectified signal may be applied to an integrating operational amplifier and the output displayed on an electrical meter.

If the signal is not sinusoidal an error can arise in mass flow measurement. Where the departure from a sinusoidal shape is due to the imposition of a steady pressure on the oscillating signal the error may be corrected by AC coupling of the electrical signal by well-known methods. Where the signal is not sinusoidal because it contains harmonics the pressure signal will have the form $$P = \rho V^2 \; [A \sin \omega t + B \sin 2\omega t + C \sin 3\omega t + L \cos \omega t + M \cos 2\omega t + N \cos 3\omega t + ...]$$

If this signal is integrated by the means already described the signal which results is:

$$X = \frac{K\rho V^2}{\omega} [A \cos \omega t + \frac{B}{2} \cos 2\omega t + \frac{C}{3} \cos 3\omega t \; ... \\ - L \sin \omega t - \frac{M}{2} \sin 2\omega t - \frac{N}{3} \sin 3\omega t \; ...]$$

This is a wave form which has a different shape from the original pressure wave form but its amplitude is still proportional to mass flow, $\rho V$, since $\omega$ is proportional to $V$.

I claim:

1. A method of measuring mass fluid flow, the method comprising the steps of passing the fluid flow through a fluidic oscillator of the wall attachment type whereby pressure changes caused by the flow are substantially proportional to the square of the fluid velocity, sensing pressure changes in the fluid flow through the oscillator, converting the sensed pressure changes to a signal representative of the amplitude and frequency of the pressure change, integrating the signal and determining the value of the integrated signal.

2. A method of measuring mass fluid flow as claimed in claim 1 wherein the integrated signal is rectified and integrated again.

3. A mass flow meter comprising a fluid oscillator of the wall attachment type wherein pressure changes caused by fluid flow through the oscillator are substantially proportional to the square of the fluid velocity, a transducer for sensing changes in the pressure of a fluid flowing through the oscillator and for converting the changes to a signal representative of the amplitude and frequency of the changes, means for integrating the signal, and means for determining the value of the integrated signal.

4. A mass flow meter as claimed in claim 1 including means for rectifying the integrated signal and means for integrating the rectified signal.

* * * * *